United States Patent
Keng et al.

(10) Patent No.: US 12,118,482 B2
(45) Date of Patent: Oct. 15, 2024

(54) METHOD AND SYSTEM FOR OPTIMIZING AN OBJECTIVE HAVING DISCRETE CONSTRAINTS

(71) Applicant: Kinaxis Inc., Kanata (CA)

(72) Inventors: Brian Keng, Toronto (CA); Anneya Golob, Toronto (CA); Yifeng He, Toronto (CA)

(*) Notice: Subject to any disclaimer, the term of this patent is extended or adjusted under 35 U.S.C. 154(b) by 789 days.

(21) Appl. No.: 17/153,257

(22) Filed: Jan. 20, 2021

(65) Prior Publication Data

US 2021/0224351 A1    Jul. 22, 2021

Related U.S. Application Data

(60) Provisional application No. 62/963,762, filed on Jan. 21, 2020.

(51) Int. Cl.
| | |
|---|---|
| *G06Q 10/04* | (2023.01) |
| *G06F 17/11* | (2006.01) |
| *G06F 18/21* | (2023.01) |
| *G06N 7/01* | (2023.01) |
| *G06Q 10/0637* | (2023.01) |

(52) U.S. Cl.
CPC ............ *G06Q 10/04* (2013.01); *G06F 17/11* (2013.01); *G06F 18/217* (2023.01); *G06N 7/01* (2023.01); *G06Q 10/0637* (2013.01)

(58) Field of Classification Search
CPC .. G06Q 10/04; G06Q 10/0637; G06F 18/217; G06F 17/11; G06N 7/01
See application file for complete search history.

(56) References Cited

U.S. PATENT DOCUMENTS

| | | |
|---|---|---|
| 2004/0133504 A1 | 7/2004 | Dalal |
| 2006/0271210 A1 | 11/2006 | Subbu et al. |

(Continued)

FOREIGN PATENT DOCUMENTS

| | | |
|---|---|---|
| CN | 103294857 A | 9/2013 |
| CN | 109241630 A | 1/2019 |

OTHER PUBLICATIONS

Bergstra J, Bardenet R, Bengio Y, Kégl B. Algorithms for hyper-parameter optimization. Advances in neural information processing systems. 2011;24. (Year: 2011).*

(Continued)

*Primary Examiner* — Chuen-Meei Gan
(74) *Attorney, Agent, or Firm* — Borden Ladner Gervais LLP; Haya Shehab; Todd Keeler

(57) ABSTRACT

A system and method for optimizing an objective having discrete constraints using a dataset, the dataset including a plurality of aspects associated with the objective. The method comprising: receiving the dataset, the objective, and constraints, at least one of the constraints comprising discrete values; receiving a seed solution comprising initial values for the at least the constraints; iteratively performing until a predetermined threshold is reached: determining a constraint space for each of the constraints have discrete values using a determination of a constraint satisfaction problem; determining an optimized value of the objective using an optimization model, the optimization model taking as input the dataset and the constraint space; and outputting the optimized objective.

20 Claims, 6 Drawing Sheets

(56) References Cited

U.S. PATENT DOCUMENTS

| | | | | |
|---|---|---|---|---|
| 2014/0222506 A1* | 8/2014 | Frazer | .................. | G06Q 30/02 |
| | | | | 705/7.29 |
| 2019/0272465 A1* | 9/2019 | Kimura | .................. | G06N 3/006 |
| 2019/0286786 A1* | 9/2019 | Ebrahimi | ................ | G06F 30/17 |
| 2020/0210832 A1* | 7/2020 | Driscoll | ................ | G06F 18/29 |

OTHER PUBLICATIONS

International Search Report issued in respect of corresponding PCT International Patent Application No. PCT/CA2021/050057 on Apr. 6, 2021.
Aloul, F., "On Solving Optimization Problems Using Boolean Satisfiability," Proceeding of the First International Conference on Modeling, Simulation and Applied Optimization, 2005, pp. 1-6.
Canadian Patent Application No. 3131040 Office Action dated Oct. 11, 2023.
European Patent Application No. 21745113.7, Extended European Search Report dated Feb. 21, 2023.
International Patent Application No. PCT/CA2021/050057, International Search Report and Written Opinion, dated Apr. 6, 2021.
International Patent Application No. PCT/CA2021/050057, International Preliminary Report on Patentability dated Jul. 26, 2022.
Kastner, et al., Model-based Optimisation With Tree-structured Parzen Estimation for Discrete Event Simulation at Container Terminals, 2019, pp. 489-498.
Srivastava, et al., "An Optimization Method for Solving Mixed Discrete-continuous Programming Problems," Computers and Mathematics With Applications, 2007, vol. 53, pp. 1481-1491.
Canadian Patent Application No. 3131040 Office Action dated Jun. 18, 2024.

\* cited by examiner

| No. of this week | Sold units for SKU-1 in previous week | Sold units for SKU-2 in previous week | Discount for SKU-1 in previous week | Discount for SKU-2 in previous week | Num. of holidays in this week | Store open days in this week | SKU-1 stock level | SKU-2 stock level |
|---|---|---|---|---|---|---|---|---|

FIG. 5

METHOD AND SYSTEM FOR OPTIMIZING AN OBJECTIVE HAVING DISCRETE CONSTRAINTS

CROSS-REFERENCE TO RELATED APPLICATIONS

The present application for patent claims benefit of U.S. Provisional Patent Application Ser. No. 62/963,762, filed Jan. 21, 2020, assigned to the assignee hereof and hereby expressly incorporated by reference herein.

TECHNICAL FIELD

The following relates generally to data processing, and more specifically, to a method and system for optimizing an objective having discrete constraints.

BACKGROUND

Prescriptive analytics are a form of advanced analytics. Prescriptive analytics generally include predictive analytics, such as predictive modeling, and optimal decision making, such as optimizing based on the predictive models. Generally, prescriptive analytics can be categorized as cases where the predictive models can be represented as explicit functions or cases where the predictive models cannot be represented as explicit functions. There are generally substantial challenges to generating prescriptive analytics where a mix or combination of such categories are present in the features or constraints of a model.

BRIEF SUMMARY

In aspects, there is provided is a system and method for optimizing an objective having discrete constraints using a dataset, the dataset including a plurality of aspects associated with the objective. The method comprising: receiving the dataset, the objective, and constraints, at least one of the constraints comprising discrete values; receiving a seed solution comprising initial values for the at least the constraints; iteratively performing until a predetermined threshold is reached: determining a constraint space for each of the constraints have discrete values using a determination of a constraint satisfaction problem; determining an optimized value of the objective using an optimization model, the optimization model taking as input the dataset and the constraint space; and outputting the optimized objective.

In one aspect, a method for optimizing an objective having discrete constraints using a dataset, the dataset includes a plurality of aspects associated with the objective, the method executed on at least one processing unit, the method includes receiving the dataset, the objective, and constraints, the constraints includes a set of discrete constraints. The method also includes receiving a seed solution to the discrete constraints in view of the objective. The method also includes iteratively performing an optimization until a criteria is reached, the iteration includes determining a constraint space for each of the discrete constraints using a determination of a constraint satisfaction problem, and determining an optimized value of the objective using an optimization model, the optimization model taking as input the dataset and the constraint space. The method also includes outputting the optimized objective once the criteria is reached.

The method may also include where the constraint satisfaction problem is a Boolean satisfiability problem or a satisfiability modulo theories solver. The method may also include where the optimization model uses a sequential optimization technique or a reinforcement learning technique. The method may also include where the optimization model includes continuous features of the dataset. The method may also include where the criteria is either a predetermined number of iterations or an optimized objective, the optimized objective being either a minimization of a loss function below a first predetermined threshold, or a maximization of reward above a second predetermined threshold.

In one aspect, a computing apparatus for optimizing an objective having discrete constraints using a dataset, the dataset includes a plurality of aspects associated with the objective, the system includes a processor. The computing apparatus also includes a memory storing instructions that, when executed by the processor, configure the apparatus to receive the dataset, the objective, and constraints, the constraints includes a set of discrete constraints. The computing apparatus also includes a memory storing instructions that, when executed by the processor, configure the apparatus to receive a seed solution to the discrete constraints in view of the objective. The computing apparatus also includes a memory storing instructions that, when executed by the processor, configure the apparatus to iteratively perform an optimization until a criteria is reached, the iteration includes determine a constraint space for each of the discrete constraints using a determination of a constraint satisfaction problem, and determine an optimized value of the objective using an optimization model, the optimization model taking as input the dataset and the constraint space. The computing apparatus also includes a memory storing instructions that, when executed by the processor, configure the apparatus to output the optimized objective once the criteria is reached.

The computing apparatus may also include where the constraint satisfaction problem is a Boolean satisfiability problem or a satisfiability modulo theories solver. The computing apparatus may also include where the optimization model uses a sequential optimization technique or a reinforcement learning technique. The computing apparatus may also include where the optimization model includes continuous features of the dataset. The computing apparatus may also include where the criteria is either a predetermined number of iterations or an optimized objective, the optimized objective being either a minimization of a loss function below a predetermined threshold, or a maximization of reward above a predetermined threshold.

In one aspect, a non-transitory computer-readable storage medium, the computer-readable storage medium including instructions that when executed by a computer, cause the computer to receive a dataset, an objective, and constraints, the constraints includes a set of discrete constraints. The non-transitory computer-readable storage medium also includes receive a seed solution to the discrete constraints in view of the objective. The non-transitory computer-readable storage medium also includes iteratively perform an optimization until a criteria is reached, the iteration includes determine a constraint space for each of the discrete constraints using a determination of a constraint satisfaction problem, and determine an optimized value of the objective using an optimization model, the optimization model taking as input the dataset and the constraint space. The non-transitory computer-readable storage medium also includes output the optimized objective once the criteria is reached.

The computer-readable storage medium may also include where the constraint satisfaction problem is a Boolean satisfiability problem or a satisfiability modulo theories solver. The computer-readable storage medium may also include where the optimization model uses a sequential optimization technique or a reinforcement learning technique. The computer-readable storage medium may also include where the optimization model includes continuous features of the dataset. The computer-readable storage medium may also include where the criteria is either a predetermined number of iterations or an optimized objective, the optimized objective being either a minimization of a loss function below a first predetermined threshold, or a maximization of reward above a second predetermined threshold. Other technical features may be readily apparent to one skilled in the art from the following figures, descriptions, and claims. The method may also include where the optimization model uses a Tree of Parzen Estimators technique. The method may also include where the optimization model uses an asynchronous advantage actor-critic (A3C) approach, or an A3C approach with advantage estimation. The computing apparatus may also include where the optimization model uses a Tree of Parzen Estimators technique. The computing apparatus may also include where the optimization model uses an asynchronous advantage actor-critic (A3C) approach, or an A3C approach with advantage estimation. The computer-readable storage medium may also include where the optimization model uses a Tree of Parzen Estimators technique. The computer-readable storage medium may also include where the optimization model uses an asynchronous advantage actor-critic (A3C) approach or an A3C approach with advantage estimation.

These and other embodiments are contemplated and described herein. It will be appreciated that the foregoing summary sets out representative aspects of systems and methods to assist skilled readers in understanding the following detailed description.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. The features of the invention will become more apparent in the following detailed description in which reference is made to the appended drawings wherein:

FIG. 5 is an example of a state vector for a retail promotion example; and

DETAILED DESCRIPTION

Figure 1:
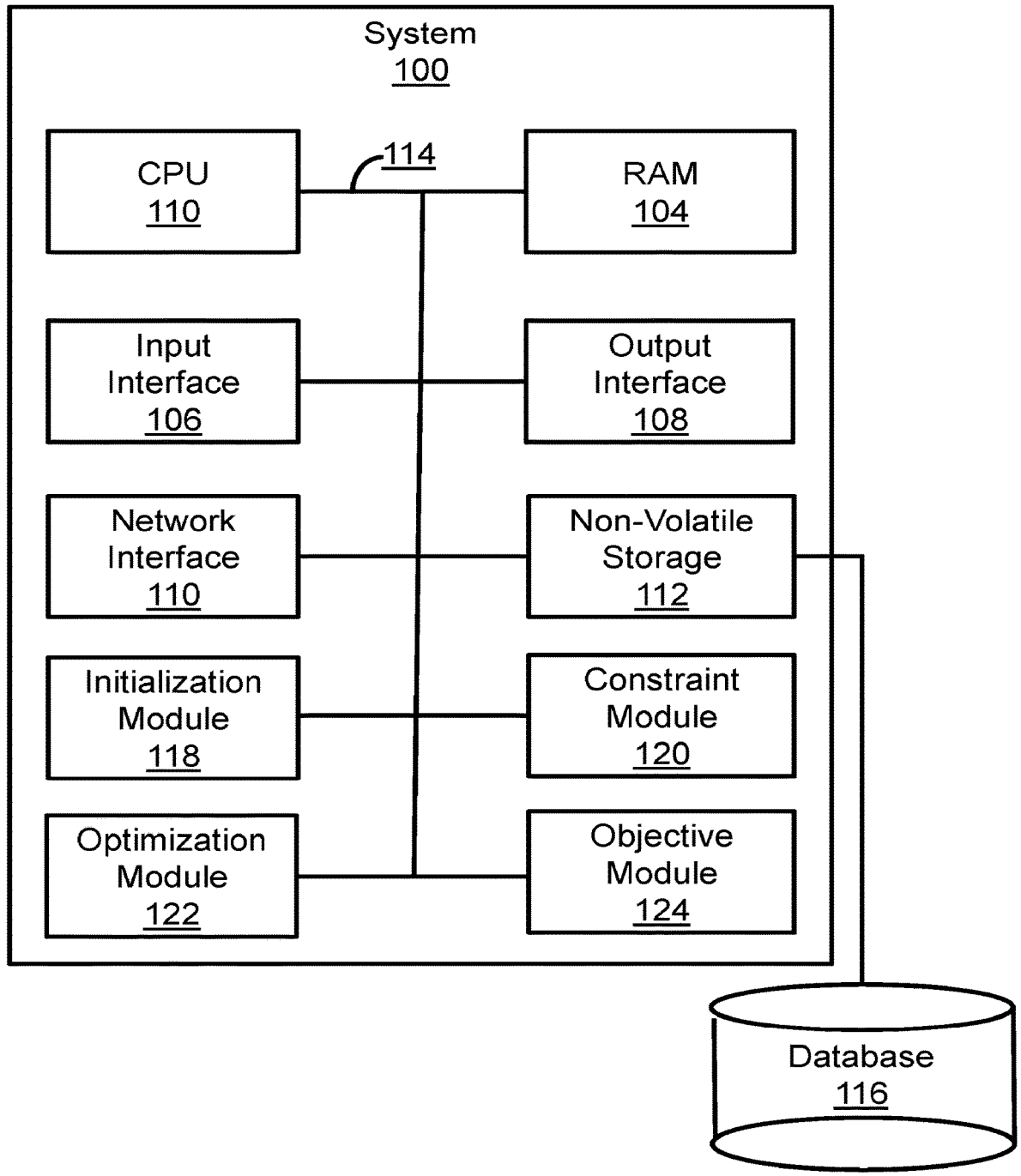
FIG. 1 illustrates is a schematic diagram of a system for optimizing an objective having discrete constraints, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one by one or by a plurality of processors, even though a single processor may be exemplified. Any method, application or module herein described may be implemented using computer readable/executable instructions that may be stored or otherwise held by such computer readable media and executed by the one or more processors.

The following relates generally to data processing, and more specifically, to a method and system for optimizing an objective having discrete constraints.

For the sake of clarity of illustration, the following disclosure may refer to the implementation of the present embodiments with respect to an example of retail promotion optimization; however, it is appreciated that the embodiments described herein can be used for any suitable application of prescriptive analytics having discrete constraints. As an example, for applications of retail assortment (what specific products to display on store shelving), and for applications of advertisement placement (which advertisements to put in which markets, for how long, and in what order).

Prescriptive analytics can generally by divided into two categories based on predictive models. In a first category, there are predictive models that can be represented as explicit functions (such as linear model or polynomial model). Based on the predictive model functions, an optimization problem can then be formulated for optimal decision making. If the formulated optimization problem is NP hard, it can be converted to an approximate problem which can be efficiently solved. However, in some cases, the size of the problem grows combinatorically with each variable because of large interdependencies with each decision, which makes approximation very challenging. In a second category, there are predictive models that cannot be easily represented as explicit functions (such as a computer simulation or problems involving discrete or non-differentiable functions). In such case, it is generally not possible to express the optimization problem fully mathematically, even where there is an objective function, due to the discrete nature of the constraints. Advantageously, the present embodiments provide an approach for addressing optimization problems with hard constraints.

Referring now to FIG. 1, a system 100 for optimizing an objective having discrete constraints, in accordance with an embodiment, is shown. In this embodiment, the system 100 is run on a server. In further embodiments, the system 100 can be run on any other computing device; for example, a desktop computer, a laptop computer, a smartphone, a tablet computer, a mobile device, a smartwatch, or the like.

In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, an input interface 106, an output interface 108, a network interface 110, non-volatile storage 112, and a local bus 114 enabling CPU 102 to communicate with the other components. CPU 102 executes an operating system, and various modules, as described below in greater detail. RAM 104 provides relatively responsive volatile storage to CPU 102. The input interface 106 enables an administrator or user to provide input via an input device, for example, a keyboard and/or mouse. The output interface 108 outputs information to output devices, for example, a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data can be stored in a database 116. During operation of the system 100, the operating system, the modules, and the related data may be retrieved from the non-volatile storage 112 and placed in RAM 104 to facilitate execution.

In an embodiment, the system 100 further includes an initialization module 118, a constraint module 120, an optimization module 122, and an objective module 124. In some cases, the modules 118, 120, 122, 124 can be executed on the CPU 110. In further cases, some of the functions of the modules 118, 120, 122, 124 can be executed on a server, on cloud computing resources, or other devices. In some cases, some or all of the functions of any of the modules 118, 120, 122, 124 can be run on other modules.

In many approaches, forecasting optimization is formulated as either a linear or quadratic programming problem. The objective function maps to the overall objective and constraints model both forecasting and user-specified constraints. However, a forecasting model that uses such a problem formulation, by definition, uses a linear or quadratic model; which is a relatively simple model with sub-optimal accuracy for many contexts because it is unable to capture some of the complex non-linear interactions of the problem. In these approaches, in order to account for discrete (hard) constraints, a system designer has to design an altered loss function or reward function to optimize for the constraints, which is not trivial depending on the constraints; or the system designer has to expend great effort searching to generate a candidate solution, and iteratively try such solution.

The system 100 advantageously addresses optimization in an approach that provides relatively high accuracy compared to other approaches, while respecting hard constraints. As described herein, the system 100 separates handling of discrete constraints, using a constraint satisfaction problem, with optimization of the objective (which is continuous) using reinforcement learning or sequential optimization techniques, or both. These two bifurcated steps can be iterated to arrive at an optimized objective that meets a predetermined threshold or iteration count.

Figure 2:
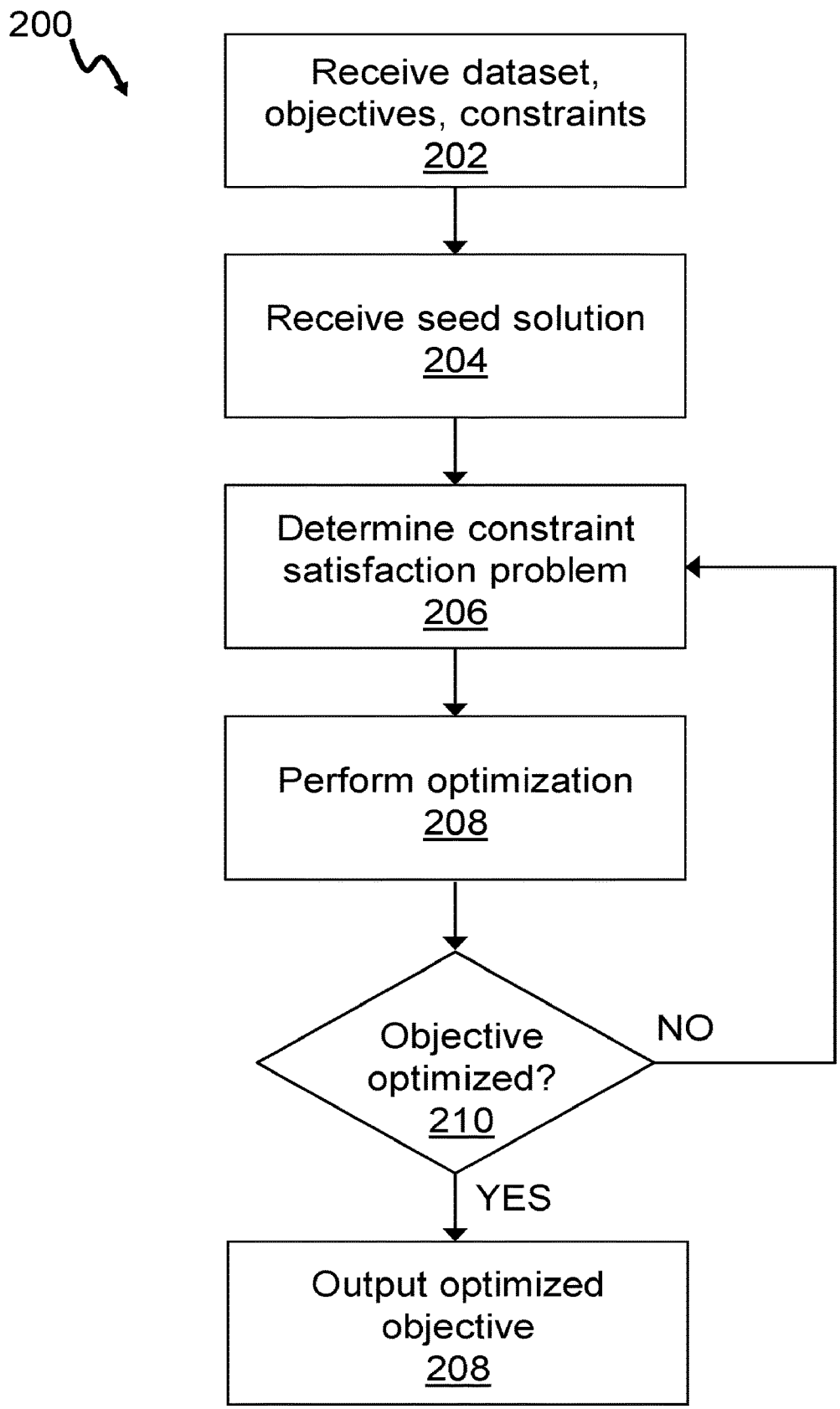
FIG. 2 illustrates an aspect of the subject matter in accordance with one embodiment. is a flowchart of a method for optimizing an objective having discrete constraints, in accordance with an embodiment.

Turning to FIG. 2, a flowchart for a method 200 for optimizing an objective having discrete constraints, according to an embodiment, is shown. The optimizing is based on a dataset, for example, as stored in the database 116 or as otherwise received.

At block 202, the initialization module 118 receives the dataset, one or more objectives to be optimized based on the dataset, and one or more discrete constraints from the input interface 106, the network interface 110, and/or the non-volatile storage 112.

At block 204, the initialization module 118 receives a seed (or initial) solution to the discrete constraints in view of the objective. Generally, this is an ab initio, hypothesized, or test solution that has not been optimized.

At block 206, the constraint module 120 determines a range (or a set of options or a specific value) for each of the constraints that are close to the seed solution. The constraint module 120 determines such closeness by generating a constraint space of such ranges around those values provided in the seed solution. The range can be determined using any suitable constraint satisfaction problem (CSP); for example, Boolean satisfiability problem (Boolean SAT), satisfiability modulo theories (SMT) solvers, and the like. In some cases, the constraint module 120 can determine the range for each constraint separately.

CSPs generally aim to find a solution that satisfies a given list of constraints for given variables. The solution approach between different approaches can vary and depending on the domain of the variables (for example, Boolean for SAT or more general types for SMT). Generally, CSPs do not explicitly take into account an objective function (as opposed to linear or quadratic programming approaches) and are generally at least NP-hard. The hardness is generally due to the constraints and the non-differentiability/continuous nature of the objective. Thus, CSPs generally involve a two-step approach: (1) find an acceptable solution, and (2)

process it through an objective estimator (for example, a simulation or a complex model). The two steps can then be repeated by adding additional constraints to the search space. In some cases, the additional constraints can be as simple as not searching for existing solutions. In further cases, the additional constraints can be more complex based on various rules and objectives; for example, using the optimization techniques described in block 208 below.

At block 208, the optimization module 122 performs optimization using an optimization model. The optimization model takes as input the dataset and the constraint space determined by the constraint module 120. The optimization model determines an optimized solution to the objective using the constraint space as input. The optimization model can use, for example, a sequential optimization technique or a reinforcement learning technique. In some cases, the input of the optimization model further comprises any features of the dataset that are continuous (i.e., non-discrete).

In one approach, sequential optimization techniques can be used; for example, a Tree of Parzen Estimators (TPE) technique. Utilizing such techniques, the optimization module 122 generally only needs to encode the search space of the optimization as the variables to optimize over and then the TPE technique can be used to find the best match. The constraints having been efficiently modelled due to the pruning of each proposed candidate solution by the constraint module 120 before querying of the forecasting model. This ensures that a candidate solution generally satisfies the constraints received by the initialization module 118.

Generally, sequential optimization techniques are a class of iterative approaches to solve optimization problems that deal with objectives that can be generally treated as black boxes (for example, using sequential optimization or Reinforcement Learning). Some techniques, such as TPE, assume that the black box objective is relatively expensive to determine so it is not practical to try to simulate every possible scenario; instead, the technique involves iteratively finding smart estimations as to what to try in the next iteration to find a good solution. TPE uses a non-parametric model (Parzen estimators) to iteratively estimate if a solution will yield a better result. It balances between exploration (exploring new parts of the solution space) and exploitation (which tries to optimize parts of the space that will obviously pay off but might lead to a local minimum).

In another approach, a reinforcement learning (RL) model can be used to find the optimization solution; for example, using an asynchronous advantage actor-critic (A3C) approach. The A3C approach can be advantageous because of its asynchronous capabilities, allowing parallelization. Additionally, the stability (lower variance) of using the actor/critic RL model with advantage estimation can provide relatively better results.

At block 210, the objective module 124 determines if an optimized objective has been reached; for example, a minimization of a loss function below a predetermined threshold or a maximization of a reward above a predetermined threshold. If such optimized objective has not been reached, blocks 206 to 210 are repeated for another iteration. If such optimized objective has been reached, at block 212, the optimized objective is outputted to the output interface 108, the network interface 110, and/or the non-volatile storage 112. In further cases, the objective module 124 can iterate blocks 206 to 210 for a predetermined number of times, and thus a comparison to the above predetermined thresholds is not necessary.

In some cases, the objective module's 124 evaluation of the loss function can assume there is a black box that cannot be easily differentiated through (for example, one or more models like a neural network or random forest). The objective module 124 can use the output of the models and combine them into an arbitrary objective function. However, it should be noted that the inputs to such models are constrained and not free; thus, a CSP or other approach is used find an acceptable solution before attempting it.

In some cases, during each iteration, the constraints can change. For the purposes of illustration, the following are examples of constraints that can be added:
  Block any existing searched solution from being found again.
  Block parts of the solution space based on the probability that it will produce a better solution (for example, utilize TPE or RL).
  Generate specific rules depending on the individual problem and on the actual solution returned.

Advantageously, the iterative nature of method 200 allows for increased understanding and explainability of the output of the system 100 to a user. The system 100 can log and output each iteration, such as the constraint space or changes to a reward function, and thus a user can trace back and understand how the system 100 arrived at the optimized solution. This transparency can add trust in the system's 100 solution. In the retail promotion example described below, if you were to just give the promotion plan to a person, they may be at a total loss as to why that solution financially makes sense, and thus would be reticent to trust the solution. Whereas, if the system can illustrate how it arrived at the solution, then it can generate a much more trustable solution.

In a retail promotion optimization example, the system 100 can determine an optimal promotion plan (as the objective) over a given set of products, promotional mechanics, time periods, and constraints. There are a number of substantial challenges for determining this optimization. For example (1) the number of promotional plans grows combinatorically with the number of promotional mechanics and time periods; (2) there can be a large interdependence between promoted products (for example, cannibalization and halo effect) as well as a time-dependence (for example, promotion to no-promotion effect), necessitating larger coupled optimization problems; and (3) a promotion plan must satisfy certain hard constraints (for example, product can only be on promotion at most half the time).

The system 100 can be used to converge to a locally optimal promotion plan. The advantage of this approach is that it can leverage a more accurate demand forecasting model, which can include more features and interdependencies compared to their linear counterparts. Due to the iterative nature of the system 100, in some cases, it can be parallelized on separate processors, which can allow for as much computing power as is required.

For example, given a set of products, referred to as SKUs (denoted as S), with initial units to be promoted in a promotion which is D days ahead of now with a length of w weeks, the system 100 can be used to find an optimal promotion on each SKU on each promotional week to maximize total profit to be gained in the promotional event. The dataset can comprise historical sales data on the set of SKUs with various promotional events/levels applied. Additionally, given an available budget as input, the system 100 can be used to determine: (1) how many units for each SKUs should be purchased from vendors for the promotion; and (2) what are the optimal promotions to be applied for each SKU and each week, to maximize total profit in the promotion. There are a number of substantial technical challenges for determining the optimal promotion objective, for example:

- Cannibalization among the SKUs. The promotion of one SKU may 'eat' up the demand of other SKUs. It is technically challenging to optimizing the promotion assignment among the set of SKUs to maximize the total profit.
- Pull forward effect for the SKU at a different time. Pull forward effect refers to that consumers may stock up on the item on sale, causing a spike in sales during the promotion and a dip in sales after the promotion. Therefore, it is technically challenging to maximize the total profit for a SKU over the whole promotion period.
- Profit maximization instead of sales maximization. Applying promotion leads to increased sales units, but it may not increase total profit. The objective is rather to maximize the total profit, which is the difference between the total revenue and the total cost of goods sold.
- Stockout/overstock problems. A higher promotion may cause stockout, while a lower promotion may cause overstock. Either stockout or overstock leads to profit loss.
- Time constraint. In order to maintain a high cash flow, the system 100 can assume that all SKUs will be cleared by the end of promotion event. In this way, an objective is to maximize the total profit gained in the promotion period.

In the retail promotion optimization example, inputs from the dataset can include such data as: transactions, inventory, past promotion mechanics, product attributes, store attributes, secondary shelf (location of a product on promotion within the store), vendor funding, product costs/margins, user-defined objectives and constraints, and the like.

In this retail promotion optimization example, the seed solution can be a previous year's promotion schedule, or a future promotion schedule developed by a member of the retail store. In this example, the discrete constraints, to be handled by the constraint module 120, can include which products to put on promotion, the promotion mechanics, product/store attributes, and the like. The continuous variable constraints, that can be handled by the optimization module 122, can include the inventory, price, and dates of promotion.

In this retail promotion optimization example, each week that has a promotional slot can have an associated Boolean variable that indicates if a given offer or promotion would be active that week. Examples of constraints in this case can be:

- Each week, only X promotions would be allowed (e.g., ai+bi+Ci=1, where ai i s promotion a offered in week i); and
- =1,· Cannot run a promotion for a product two weeks in a row (e.g. a1+a2<=1, a2+a3<=1, and so on).

After finding a sufficient solution with CSP, the optimization module 122 can use a model on the solution to evaluate the loss function.

Figure 3:
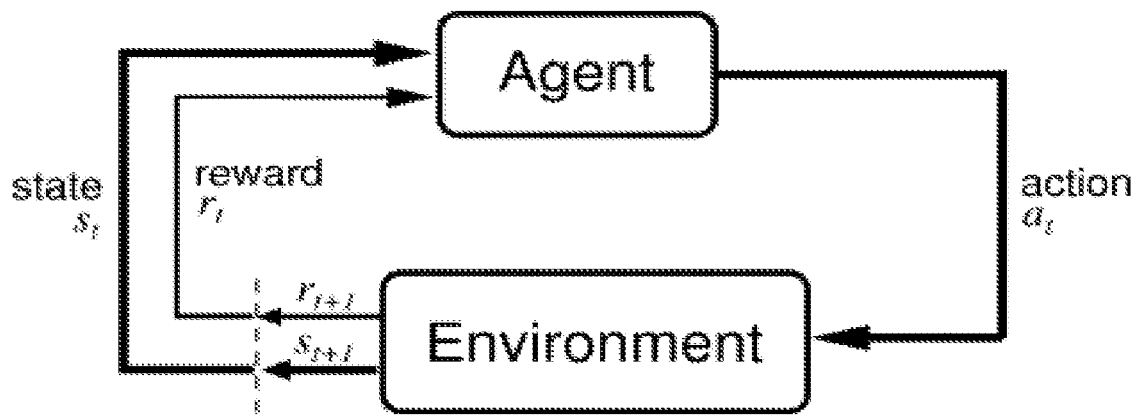
FIG. 3 is a diagrammatic example of a reinforcement learning approach.
Figure 4:
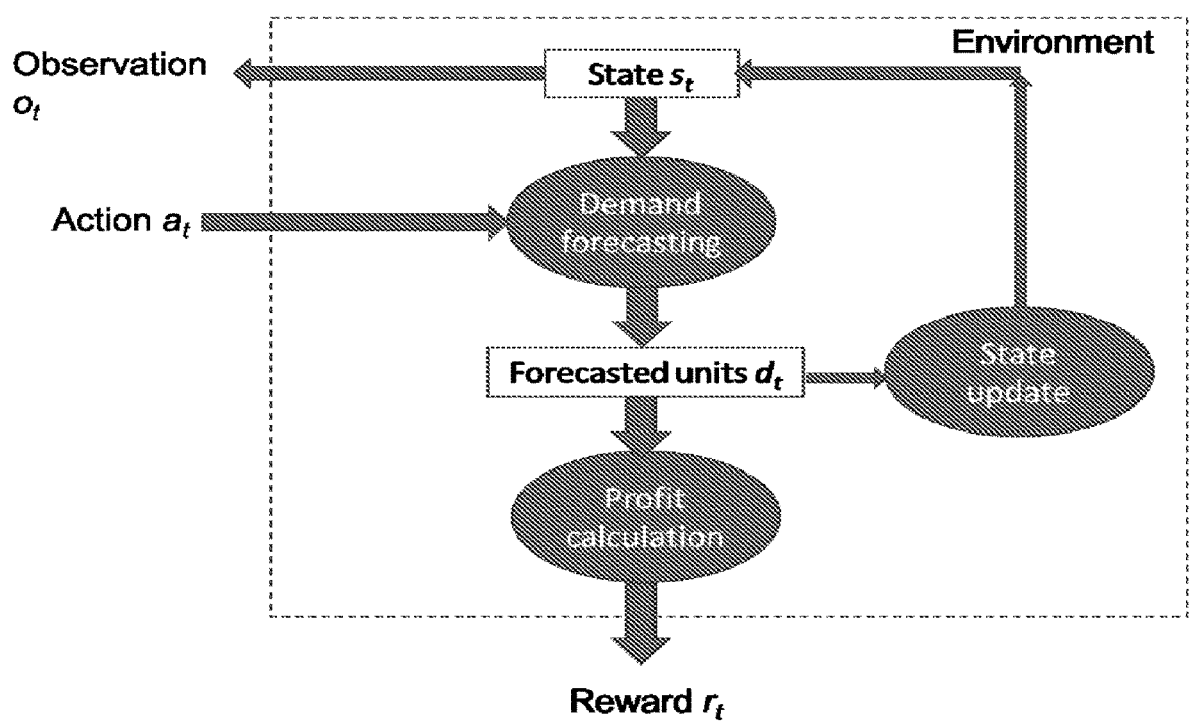
FIG. 4 is a diagrammatic example of an environment simulator for the reinforcement learning approach of FIG. 3.

The optimization module 122 can use reinforcement learning, as described above, in one approach to determine the optimal promotion objective. As illustrated in FIG. 3, in an example, an agent can be trained to optimize the promotion objective. The agent learns its planning policy from the interaction with the environment, aiming to maximize the total profit in the whole promotion period. Advantageously, the optimal promotion decisions made by the agent can be used to address the above challenges. In this example, in order for the agent to interact with the environment, an environment simulator can be built, an example of which is shown in FIG. 4. In this example, it is assumed that the environment is fully observable, thus observation O1 is equal to state s1. The case where there are two competing SKUs in the SKU set is examined first. The methodology for two-SKU case can be extended to multi-SKU case with a higher dimension in action space and state space. Each promotion level is represented by a percentage discount. The state is represented by a state vector as exemplified in FIG. 5. In further cases, particularly for reinforcement learning, the simulation of the environment can be a machine learning forecasting model. In order to ensure that each decision in each time step of reinforcement learning satisfies the given constraints, CSP is advantageously interleaved with the reinforcement learning (as described herein) as the system 100 determines the retail promotion solution.

The features of both SKUs are put into one state vector for capturing the cannibalization between them, and sales information of previous weeks are added for capturing the pull-forward effect. By concatenating the action vector and the state vector as input to a regression model (for example, a random forest regressor or neural network regressor), the optimization module 122 can estimate the units to be sold in the promotion week. The forecasted units for SKU-1 and SKU-2 are used to determine an immediate reward and update the state. The immediate reward is determined by:

$$r_t = \sum_{m=1}^{2} \left[ d_t^{(m)} \left( p^{(m)} (1 - k_t^{(m)}) - c^{(m)} \right) \right]$$

where $r_t$ is the reward at time t, $d_t^{(m)}$ is the sold units for SKU-m at time t, $k_t^{(m)}$ is the discount percentage for SKU-m at time t, and $c^{(m)}$ is the cost price for SKU-m.

Figure 6:
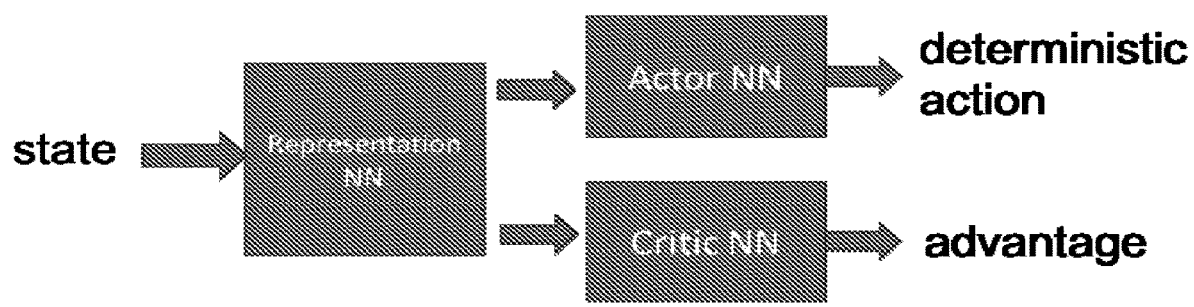
FIG. 6 is a neural network example of an actor for the reinforcement learning approach of FIG. 3.

The conceptual agent interacts with the environment and learns its policy from the interaction experience. The promotion period can be divided into H promotion weeks. At the beginning of each promotion week, the agent observes the state, executes an action, and then receives an immediate reward by the end of the promotion week. The process is repeated until the end of the whole promotion period. An episode consists of H interactions (e.g., one interaction per week). The cumulative reward for an episode is given by:

$$R = \sum_{h=1}^{H} \gamma^{h-1} r_h,$$

where $\gamma$ is the positive discount factor (e.g., $\gamma$=0.99), $r_h$ is the immediate reward received at week h. In an example, the agent can be represented by a neural network (NN), as exemplified in FIG. 6. The NN can include three parts: representation, actor, and critic. The output of the actor is the action to be taken by the agent. The output of the critic is an advantage value which is used to evaluate the advantage of the output action. In an example, stochastic gradient descent can be used to update the weights of the NN, aiming to produce actions which can maximize the expected episode reward.

The present inventors have conducted an example experiment of the system 100 on the retail promotion example across 10 products for a 4 week time period with a straight promotional discount between 0 and 50% off; where the objective was profit maximization. The optimization model modelled cross-price effect of products. The system 100 was tasked with choosing the optimal promotional mechanic for each product at each time period; where the environment consisted of a demand forecasting model and the reward was profit for the number of predicted units sold given by the forecasting model. The example experiments demonstrated increased accuracy over previous approaches.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A method for optimizing a retail promotion having discrete constraints using a dataset, the dataset comprising a plurality of aspects associated with the retail promotion including historical sales data, the method executed on at least one processing unit, the method comprising:
receiving the dataset, the retail promotion, and constraints, the constraints comprising a set of discrete constraints, wherein the set of discrete constraints comprises one or more of which products to put on promotion, promotion mechanics, product attributes and store attributes;
receiving a seed solution to an optimization model based on an objective, the seed solution based on the discrete constraints in view of the retail promotion, wherein the seed solution comprises a previous year's promotion schedule or a pre-developed future promotion schedule;
iteratively performing an optimization iteration until a criteria is reached, the optimization iteration comprising:
generating a constraint space that comprises a range or set of options for at least one of the discrete constraints and that defines a closeness to values provided in the seed solution, wherein the range or set of options are determined by a constraint satisfaction problem, and
determining an optimized value of at least one variable of the optimized model based on the objective that is within the constraint space, the optimization model taking as input the dataset and the constraint space;
outputting an optimized retail promotion based on the optimized value once the criteria is reached; and,
determining how many units for each of the products put on promotion should be purchased from vendors based on the optimized retail promotion.

2. The method of claim 1, wherein the constraint satisfaction problem is a Boolean satisfiability problem or a satisfiability modulo theories solver.

3. The method of claim 1, wherein the optimization model uses a sequential optimization technique or a reinforcement learning technique.

4. The method of claim 3, wherein the optimization model uses a Tree of Parzen Estimators technique.

5. The method of claim 3, wherein the optimization model uses an asynchronous advantage actor-critic (A3C) approach, or an A3C approach with advantage estimation.

6. The method of claim 1, wherein the optimization model comprises continuous features of the dataset.

7. The method of claim 1, wherein the criteria is either a predetermined number of iterations or an optimized objective, the optimized objective being either a minimization of a loss function below a first predetermined threshold, or a maximization of reward above a second predetermined threshold.

8. A computing apparatus for optimizing a retail promotion having discrete constraints using a dataset, the dataset comprising a plurality of aspects associated with the retail promotion including historical sales data, the apparatus comprising:
a processor; and
a memory storing instructions that, when executed by the processor, configure the apparatus to:
receive the dataset, the retail promotion, and constraints, the constraints comprising a set of discrete constraints, wherein the set of discrete constraints comprising one or more of which products to put on promotion, promotion mechanics, product attributes and store attributes;
receive a seed solution to an optimization model based on an objective, the seed solution based on the discrete constraints in view of the retail promotion, wherein the seed solution comprises a previous year's promotion schedule or a pre-developed future promotion schedule;
iteratively perform an optimization iteration until a criteria is reached, the optimization iteration comprising:
generate a constraint space that comprises a range or set of options for at least one of the discrete constraints and that defines a closeness to values provided in the seed solution, wherein the range or set of options are determined by a constraint satisfaction problem, and
determine an optimized value of at least one variable of the optimized model based on the objective that is within the constraint space, the optimization model taking as input the dataset and the constraint space;
output an optimized retail promotion based on the optimized value once the criteria is reached; and
determine how many units for each of the products put on promotion should be purchased from vendors based on the optimized retail promotion.

9. The computing apparatus of claim 8, wherein the constraint satisfaction problem is a Boolean satisfiability problem or a satisfiability modulo theories solver.

10. The computing apparatus of claim 8, wherein the optimization model uses a sequential optimization technique or a reinforcement learning technique.

11. The computing apparatus of claim 10, wherein the optimization model uses a Tree of Parzen Estimators technique.

12. The computing apparatus of claim 10, wherein the optimization model uses an asynchronous advantage actor-critic (A3C) approach, or an A3C approach with advantage estimation.

13. The computing apparatus of claim 8, wherein the optimization model comprises continuous features of the dataset.

14. The computing apparatus of claim 8, wherein the criteria is either a predetermined number of iterations or an optimized objective, the optimized objective being either a minimization of a loss function below a predetermined threshold, or a maximization of reward above a predetermined threshold.

15. A non-transitory computer-readable storage medium for optimizing a retail promotion having discrete constraints using a dataset, the dataset comprising a plurality of aspects associated with the retail promotion including historical sales data, the computer-readable storage medium including instructions that when executed by a computer, cause the computer to:

receive the dataset, the retail promotion, and constraints, the constraints comprising a set of discrete constraints, wherein the set of discrete constraints comprising one or more of which products to put on promotion, promotion mechanics, product attributes and store attributes;

receive a seed solution to an optimization model based on an objective, the seed solution based on the discrete constraints in view of the retail promotion, wherein the seed solution comprises a previous year's promotion schedule or a pre-developed future promotion schedule;

iteratively perform an optimization iteration until a criteria is reached, the optimization iteration comprising:

generate a constraint space that comprises a range or set of options for at least one of the discrete constraints and that defines a closeness to values provided in the seed solution, wherein the range or set of options are determined by a constraint satisfaction problem, and determine an optimized value of at least one variable of the optimized model based on the objective that is within the constraint space, the optimization model taking as input the dataset and the constraint space;

output an optimized retail promotion based on the optimized value once the criteria is reached; and, determining how many units for each of the products put on promotion should be purchased from vendors based on the optimized retail promotion.

16. The computer-readable storage medium of claim 15, wherein the constraint satisfaction problem is a Boolean satisfiability problem or a satisfiability modulo theories solver.

17. The computer-readable storage medium of claim 15, wherein the optimization model uses a sequential optimization technique or a reinforcement learning technique.

18. The computer-readable storage medium of claim 17, wherein the optimization model uses a Tree of Parzen Estimators technique.

19. The computer-readable storage medium of claim 17, wherein the optimization model uses an asynchronous advantage actor-critic (A3C) approach or an A3C approach with advantage estimation.

20. The computer-readable storage medium of claim 15, wherein the criteria is either a predetermined number of iterations or an optimized objective, the optimized objective being either a minimization of a loss function below a first predetermined threshold, or a maximization of reward above a second predetermined threshold.

* * * * *